Sept. 7, 1948.  E. L. PRATT  2,448,619
AUTOMATIC ELECTROMAGNETIC AUTOMOBILE
DOOR EMERGENCY LATCH
Filed Nov. 7, 1946
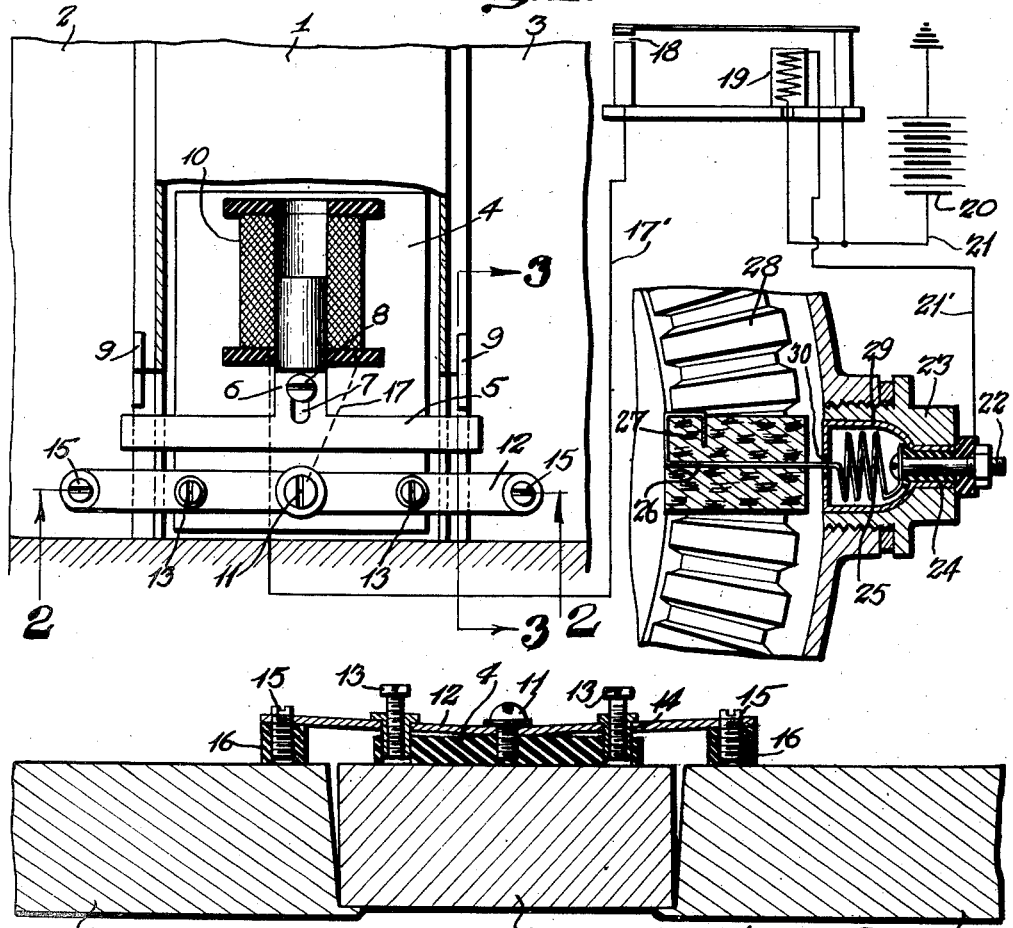
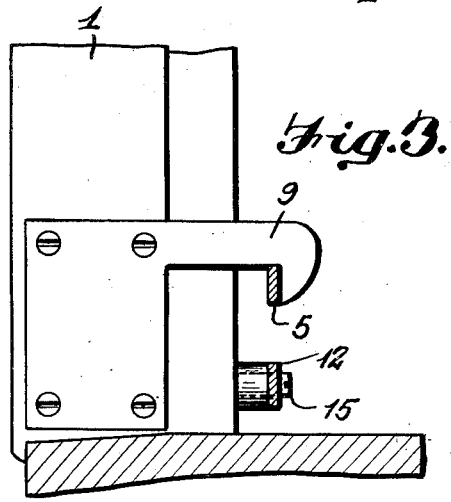
INVENTOR.
Edward L. Pratt.
BY Victor J. Evans & Co.
ATTORNEYS Patented Sept. 7, 1948

2,448,619

UNITED STATES PATENT OFFICE 2,448,619

AUTOMATIC ELECTROMAGNETIC AUTOMOBILE DOOR EMERGENCY LATCH

Edward L. Pratt, Pekin, Ill.

Application November 7, 1946, Serial No. 708,345

3 Claims. (Cl. 180—82)

This invention relates to latching devices, and more particularly to the provision of an electromagnetically controlled device for latching the doors of an automobile.

It frequently happens that people, especially children, fall out of automobiles due to the opening of doors while the automobile is in motion, resulting in serious injury or even death.

It is, therefore, an object of this invention to provide a latching device for the doors of an automobile which automatically latches the doors in a closed condition whenever the automobile is in motion.

A further object is the provision of an electromagnetically controlled device which automatically latches the doors of a car as soon as the door starts to open, the device being effective as long as the car is in motion.

These and other objects are attained by the novel construction and arrangement of parts hereinafter described and illustrated by the accompanying drawings, forming a part hereof and in which:

Figure 1 is an elevational view of the electromagnet controlled latch embodying the invention;

Figure 2 is a view taken on the line 2—2 of Figure 1;

Figure 3 is a view taken on the line 3—3 of Figure 1.

Referring to the drawings, the control latch is shown to be mounted on the body post 1 between the front door 2 and the rear door 3 of a four door automobile. Attached to the post 1 is a sheet of fibre 4 or other non-conducting and non-magnetic material, upon which is mounted a solenoid 10 of an electro-magnet. A T-shaped stamping, having a cross bar 5 and tongue 6 with a slot 7, is secured by a screw 8 through the sheet 4 to body post 1, the slot allowing upward movement of the tongue 6 and cross bar 5. The tongue 6 can be attached to the armature of the solenoid 10, or the tongue 6 itself may serve as an armature for the solenoid. When the solenoid is energized, the cross bar 5 is raised to engage hooks 9 on the front and rear doors 2 and 3 respectively.

Attached to the sheet 4, below the cross bar 5, is a strip 12 of spring metal, the strip being attached by means of a screw 11. Contact terminal screws 13 pass through bushings 14 of conducting material and through holes in the sheet 4 to engage the metal post 1, which is grounded by securing bolts to the chassis of the automobile. At the ends of the strip 12 are set screws 15 having thereon knobs 16, which engage the front and rear doors. (See Figure 2.) When the doors are closed, the knobs 16 are raised to raise the terminals 13 from engagement with the post 1, and when the doors are slightly open, the terminals 13 are forced down by the spring action of strip 12 into engagement with the post 1.

Screw 11 is connected to one end of the solenoid 10, by a wire 17, and the other end of the solenoid is connected by a wire 17' to a relay having contacts 18 and an electro-magnet 19, which is connected to a battery 20 by a wire 21, and to a binding post 22 of a control switch by a wire 21'. (See Figure 1.)

The control switch is in the form of a plug 23, which replaces the filler plug in a rear axle or differential housing of an automobile. The binding post 22 passes through a bushing 24 of insulating material, and is connected to a conducting spring 25, which has a straight portion 26 which is attached to a block of cork 27 or the like, and supports the cork in close proximity to, but not in engagement with, the ring gear 28 of the differential. Positioned in the plug 23 is a cup 29 of aluminum or other conducting material, having a hole 30 through which the wire 26 passes.

In operation, the wire 26 does not contact the cup 29 when the car is standing still, and not in motion. But when the car is in motion, the motion of oil or other lubricant in the differential housing acts upon the block 27 to move the wire 26 into contact with the cup 29, and thus complete a circuit separate from the solenoid circuit through the plug 23 to ground.

When the car is in motion, at the least opening of a door, one of the contact screws 13 will engage the post 1 and complete a relayed circuit through the screws 13, strip 12, wire 17, solenoid 10, wire 17', relay points 18 and wire 21 to the battery. The solenoid 10 is then instantly energized to pull the bar 5 up to engage the hooks 9 and latch the doors to prevent opening thereof. When the car is standing still, the wire 26 does not engage the cup 29, thereby breaking the control circuit, and the doors are unlatched so that they can be freely opened.

It will be seen that the device automatically prevents the opening of doors while the automobile is in motion. The device can obviously be readily designed to control a single door as well as two doors, one door requiring merely the elimination of one knob 16 and a contact screw 13. The device can be readily attached to an automobile without material alterations.

The above description is to be considered as illustrative and not limitative of the invention of which modifications can be made without departing from the spirit and scope of the invention as set forth in the appended claims.

The invention having been described, what is claimed is:

1. In a latching device for the doors of an automobile, hooks on the front and rear doors, a solenoid mounted on the post of the automobile, adjacent the doors of the automobile, a cross bar adapted to be drawn up to engage the hooks when the solenoid is energized, a spring strip electrically connected to the solenoid and having contact screws adapted to engage the post as a door is opened to ground the solenoid, a control switch having a binding post, a relay winding connecting the binding post of the control switch to a battery, a wire spring connected to the binding post, breaker points controlled by said relay winding connected to said solenoid, said binding post being held by and insulated from a plug adapted to fit in a differential housing of the automobile, a cork block connected to the wire spring, said spring adapted to support said cork in close proximity to, but not in engagement with the ring gear of a differential in said housing, and a metal cup contacting the plug and having a hole through which the wire spring passes without contacting the cup when the automobile is at rest, so that when the automobile is in motion, the motion of oil between the ring gear and cork block will cause the wire spring to move into contact with the cup to ground the wire spring and close an electrical circuit through the relay winding to close the breaker points of the solenoid circuit and thereby raise the cross bar to latch the doors.

2. In a latching device for the doors of an automobile, a control switch comprising a plug adapted to replace the filler plug of the differential housing of an automobile, a terminal supported by and insulated from the plug, a wire spring connected to the terminal, a block of light material connected to the wire spring, said spring adapted to support said block in close proximity to the ring gear of a differential in said housing, and a cup of conducting material in the plug and having a hole through which the wire spring passes without contacting the cup when the automobile is as rest, so that when the automobile is in motion, the motion of oil in the differential housing will cause the block to move to cause the wire spring to engage the cup and close a circuit to ground.

3. In a device for preventing the opening of automobile doors when in motion, hooks on the doors, a cross bar adapted to engage the hooks to prevent opening of the doors, a solenoid arranged to draw the cross bar into engagement with the hooks, contact screws mounted on a spring strip having knobs engaging the doors so that when the doors are open a circuit to ground is closed through a post associated with the doors, said contact screws being connected through the strip to the solenoid, a normally open switch means for connecting the solenoid to a battery, a control switch comprising a plug adapted to replace the filler plug of a differential housing, a relay connected between the control switch and battery whereby to close said normally open switch means, a wire spring in the plug and normally insulated therefrom, said wire spring being connected to the means for connecting the solenoid to the battery, a block of light material attached to the spring, said spring adapted to support said block in close proximity to the ring gear of the differential in said housing so that when the automobile is in motion, the motion of oil in the differential will cause the sprng to close a circuit through the plug to ground, and a sheet of insulating material for mounting the solenoid on the post.

EDWARD L. PRATT.